United States Patent [19]

Inoue et al.

[11] Patent Number: 5,894,585
[45] Date of Patent: Apr. 13, 1999

[54] SYSTEM FOR RECORDING PROCESSING OPERATIONS OF ONE PROCESSING APPARATUS AND REFLECTING CONTENTS OF THE OPERATIONS WHICH HAVE NOT BEEN REFLECTED SINCE THE PREVIOUS REFLECTING

[75] Inventors: Sunao Inoue; Akitomo Sasaki, both of Kawasaki, Japan

[73] Assignee: Canon Kabushiki Kaisha, Tokyo, Japan

[21] Appl. No.: 08/393,909

[22] Filed: Feb. 24, 1995

[30] Foreign Application Priority Data

Feb. 28, 1994 [JP] Japan .................................. 6-030645
Mar. 31, 1994 [JP] Japan .................................. 6-085646

[51] Int. Cl.$^6$ ............................................. G06F 3/00
[52] U.S. Cl. ............................................. 395/827
[58] Field of Search .................. 395/200.03, 200.05, 395/850, 200, 500, 700; 364/400, 900

[56] References Cited

U.S. PATENT DOCUMENTS

| | | | |
|---|---|---|---|
| 3,823,805 | 7/1974 | Richards | 197/19 |
| 4,821,255 | 4/1989 | Kobrinski | 370/3 |
| 4,866,704 | 9/1989 | Bergman | 370/85.4 |
| 4,896,290 | 1/1990 | Rhodes et al. | 364/900 |
| 4,964,075 | 10/1990 | Shaver et al. | 364/900 |
| 5,022,028 | 6/1991 | Edmonds et al. | 371/25.1 |
| 5,062,045 | 10/1991 | Janis et al. | 395/606 |
| 5,099,433 | 3/1992 | Iwagaya | 364/474.31 |
| 5,133,065 | 7/1992 | Cheffetz et al. | 395/181 |
| 5,159,595 | 10/1992 | Flanagan et al. | 370/85.15 |
| 5,159,687 | 10/1992 | Richburg | 395/700 |
| 5,212,772 | 5/1993 | Masters | 395/182.18 |
| 5,261,094 | 11/1993 | Everson et al. | 395/600 |
| 5,311,344 | 5/1994 | Bohn et al. | 395/125 |
| 5,333,246 | 7/1994 | Nagasaka | 395/133 |
| 5,355,892 | 10/1994 | Saltzstein et al. | 128/710 |
| 5,416,693 | 5/1995 | Yoshinari | 364/400 |
| 5,434,994 | 7/1995 | Shaheen et al. | 395/500 |
| 5,463,772 | 10/1995 | Thompson et al. | 395/600 |
| 5,499,341 | 3/1996 | Wilson et al. | 395/200.03 |
| 5,504,858 | 4/1996 | Ellis et al. | 395/182.04 |
| 5,510,921 | 4/1996 | Takai et al. | 359/124 |
| 5,511,156 | 4/1996 | Nagasaka | 395/133 |
| 5,524,205 | 6/1996 | Lomet et al. | 395/182.14 |
| 5,642,496 | 6/1997 | Kanfi | 395/489 |

FOREIGN PATENT DOCUMENTS

0405859A2  6/1990  European Pat. Off. .

OTHER PUBLICATIONS

IBM Technical Disclosure Bulletin, vol. 27, No. 9, Feb. 1985, New York US, pp. 5198–5199, J.H. Dodge et al. "Automatic Backup of User Files in a Copier Control System".

Ace of the Pacific, Control Manual for, Dynamix 1992, pp. 217–220.

Primary Examiner—Thomas C. Lee
Assistant Examiner—Anderson I. Chen
Attorney, Agent, or Firm—Fitzpatrick, Cella, Harper & Scinto

[57] ABSTRACT

In an information processing method of causing a plurality of information processing apparatuses to process information, the contents of a processing operation for data are stored in an information processing apparatus main body, the stored contents of the processing operation are recorded in a portable recording medium, and the data in another information processing apparatus is processed in accordance with the contents of the processing operation recorded in the recording medium.

14 Claims, 13 Drawing Sheets

|   | 1 | 2 | 3 | 4 | 5 | 6 | 7 |
|---|---|---|---|---|---|---|---|
| (A) | * |   | * |   |   |   | * |
| (B) |   | * |   | * |   | * |   |
| (C) |   |   |   |   | * |   |   |

FIG. 12

| A | MODIFY |
|---|---|

| | B | ADD |
|---|---|---|

| | C | DELETE | | D | MODIFY |
|---|---|---|---|---|---|

FIG. 15

| SERVER ID | CLIENT ID | FILE ID | SERIAL NO. | DATA |
|---|---|---|---|---|

FIG. 16

| FILE ID | SERIAL NO. | SERVER ID |
|---|---|---|
| F | 1 | 1 |
| F | 2 | 2 |
| F | 3 | M |
| : | : | : |
| F | N | N |
| F | 0 | |
| : | | |

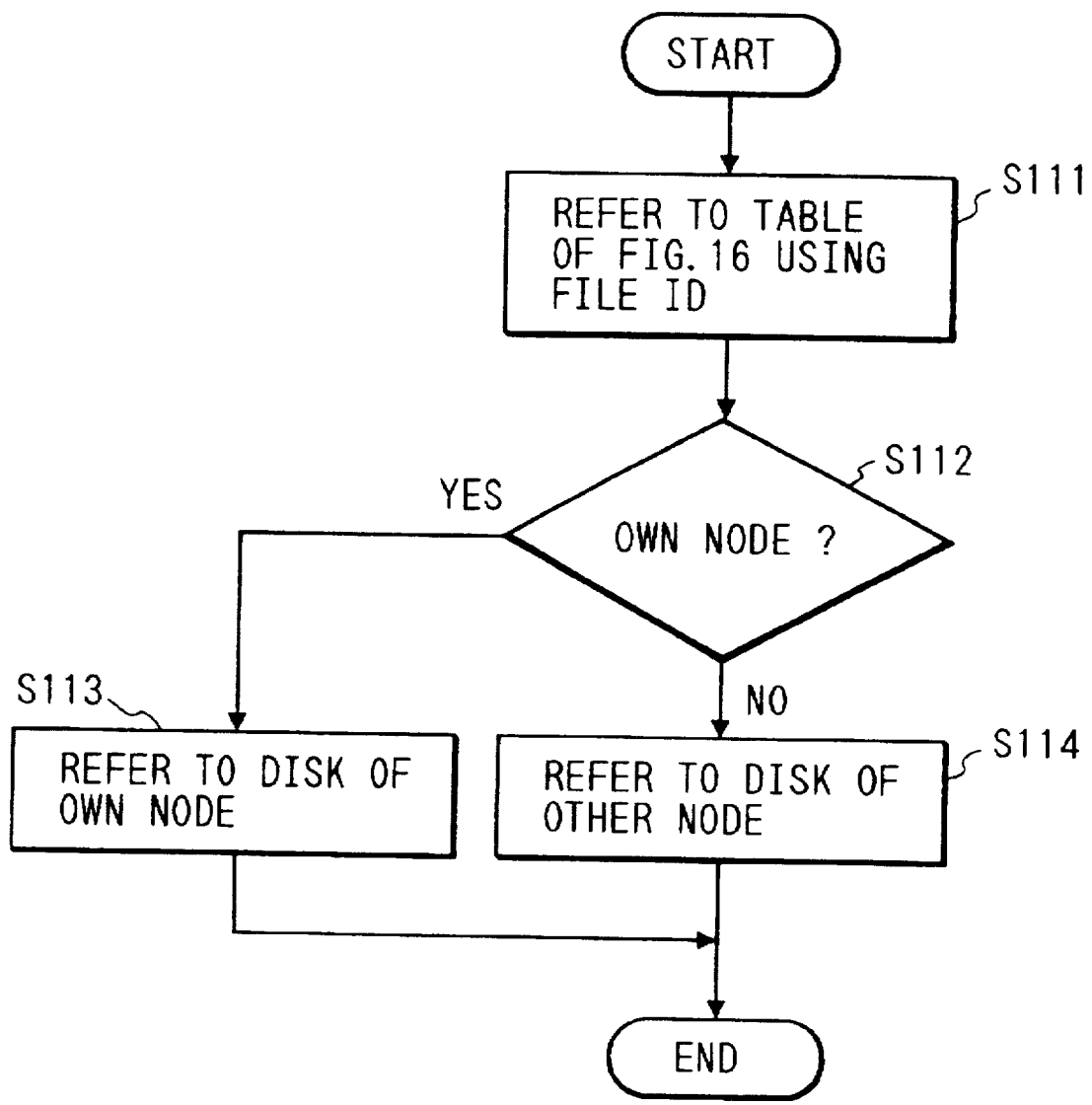

SYSTEM FOR RECORDING PROCESSING OPERATIONS OF ONE PROCESSING APPARATUS AND REFLECTING CONTENTS OF THE OPERATIONS WHICH HAVE NOT BEEN REFLECTED SINCE THE PREVIOUS REFLECTING

BACKGROUND OF THE INVENTION

1. Field of the Invention

The present invention relates to an information processing method and an apparatus therefor, which are applied to a file system in a computer system or a distributed file system in a high-speed network.

2. Related Background Art (1) When an individual person is to conventionally perform a certain job for a file stored in an information storage (e.g., a file system in a computer system) between remote locations such as locations between his home and an office, identical copies of necessary files and the like must be stored in information storages at these remote locations, and data is manually exchanged between these information storages using a portable recording medium such as a floppy disk (FD) to maintain consistency therebetween.

(2) In a conventional distributed file system, file data to be read out and written are stored in a secondary storage (disk) connected to one server in a network, and the data is read out from or written in the secondary storage through the network. To compensate for the low access speed of the secondary storage, a plurality of secondary storages are arranged in parallel with each other like a disk array.

However, in the prior art (1), every time another information processing apparatus is used, the files are recorded in a portable recording medium and stored in the external storage of this information processing apparatus. At this time, when the number of files is small, file processing for specific files can be easily managed. However, when the number of files increases, selection of files to be recorded is complicated. The user may forget to copy a modified file on the recording medium. Therefore, consistency of files may not be maintained.

The prior art (1) has the following drawbacks because consistency and matching maintenance of the contents of files between a plurality of locations must be manually performed.

An operation for maintaining consistency and matching is cumbersome.

The failure in matching maintenance may occur due to a manual operation error.

For example, as shown in FIG. 8, a series of files A, B, ... are present in two information storages 100 and 101 at locations a and b. When the contents of the file A in the information storage 100 at the location a are modified at a given time, the following series of operations must be performed. Only the modified file A is selected, and its contents are stored in a floppy disk FD. This floppy disk FD is carried to the location b, and the contents of the corresponding file in the information storage 101 are updated.

Referring to FIG. 8, the files A and B have entities Aa and Ba of the files A and B at the location a and have entities Ab and Bb of the files A and B at the location b.

Jobs necessary for maintaining consistency and matching upon (1) a modification, (2) an addition, and (3) a deletion of a file at one location will be described below.

(1) Modification of Contents of File

Assume that the entities Aa and Ab of the file A which have identical contents are present at the locations a and b, and that the contents of the entity Aa are modified at a given time and the location a. When a user then moves to the location b, he must modify the entity Ab for the modification at the location a before the contents of the file A are referred to or modified.

(2) Addition of File

When the entity Ba which is present at neither the location a nor the location b is formed at the location a, the entity Bb must be formed at the location b when the user moves to the location b.

(3) Deletion of File

Assume that entities Ca and Cb of a file C which have identical contents are present at the locations a and b. When the entity Ca is deleted at a given time and the location a, the entity Cb must be deleted at the location b when the user moves to the location b.

The arbitrary number of combinations of arbitrary jobs of all the jobs are assumed in a practical job.

As one method of avoiding such a job, all the files may be stored in a portable recording medium such as a floppy disk, and all systems may not have any file. However, this medium generally has one or both of the following drawbacks as compared with a storage generally used in a system:

The medium has a low input/output speed.

The medium has a small storage capacity.

According to this method, even if a file is temporarily copied in a storage in a system, and a job is performed using the file, the following problems are posed:

The medium cannot be used if the quantity of information to be stored exceeds a certain quantity.

The medium cannot have a sufficiently high processing speed in a job using a file.

In the prior art (2), when a plurality of secondary storages are provided, all the secondary storages must be connected to one server. In addition, since only one data line is available between the server and a client, a narrow path is formed by the network to fail to obtain a sufficiently high input/output speed.

SUMMARY OF THE INVENTION

It is an object of the present invention to provide an information processing method and an apparatus therefor, which can solve all the conventional problems described above.

It is another object of the present invention to allow a user to have the contents of identical files at a plurality of locations and facilitate to maintain consistency of files between the plurality of locations where the user performs a job using these files.

An information processing apparatus comprises a plurality of independent information storages capable of storing identical information, means for recording one of a modification, an addition, and a deletion of predetermined information stored in any one of the plurality of information storages, and means for reproducing one of the modification, the addition, and the deletion of the predetermined information at a remaining one of the plurality of information storages on the basis of the information stored in the recording means.

BRIEF DESCRIPTION OF THE DRAWINGS

FIG. 12 is a view showing a data structure in the embodiments of the present invention;

FIG. 15 is a view showing the format of data to be transmitted;

FIG. 16 is a view showing a management table; and

FIG. 17 is a view showing a management sequence.

DESCRIPTION OF THE PREFERRED EMBODIMENTS

The preferred embodiments of the present invention will be described below with reference to the accompanying drawings.

(First Embodiment)

Figure 1:
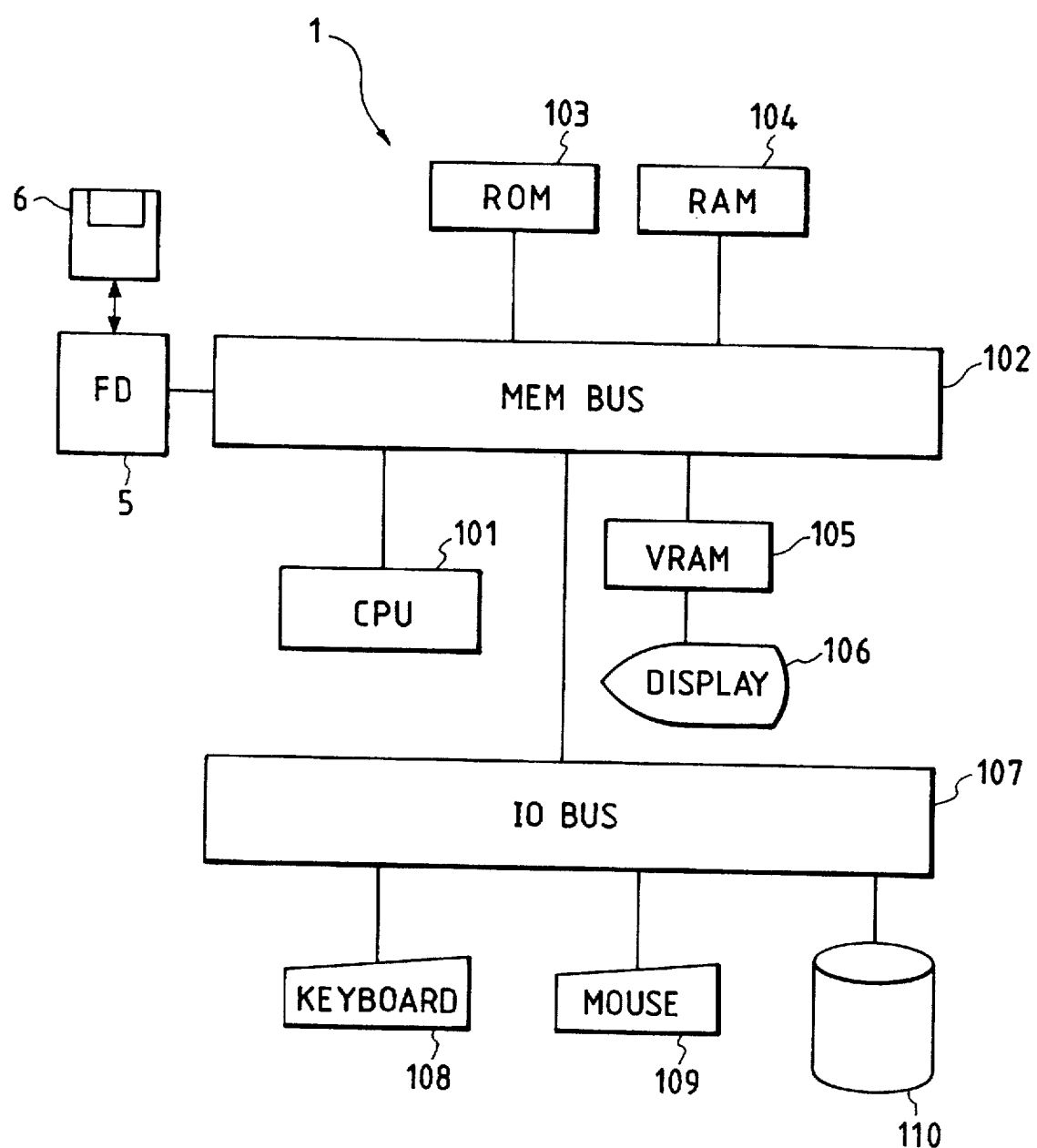
FIG. 1 is a block diagram showing the arrangement of a first information processing apparatus to which the first embodiment of the present invention can be applied.

The first embodiment of the present invention will be described with reference to FIGS. 1 to 4. FIG. 1 is a block diagram showing the arrangement of an information processing apparatus to which the first embodiment of the present invention can be applied. A first information processing apparatus 1 comprises a CPU (Central Processing Unit) 101 for controlling the overall operation of the apparatus 1. The CPU 101 is connected, through a memory bus 102, a ROM (Read Only Memory) 103, a RAM (Random Access Memory), 104, a VRAM (Video Random Access Memory) 105, and a floppy disk drive 5 for accessing a floppy disk 6. A display (display means) 106 is connected to the VRAM 105.

The memory bus 102 serves to exchange data between the CPU 101 and the ROM 103, between the CPU 101 and the RAM 104, and between the CPU 101 and the VRAM 105. The ROM 103 serves to store a program for loading an OS (Operating System). The RAM 104 serves to store the OS, an execution program, execution data, and the like of the apparatus 1. A bit map image such as a figure or picture to be displayed on the display 106 is transferred to the VRAM 105. The display 106 comprises a CRT (Cathode Ray Tube), an LCD (Liquid Crystal Display), or the like. Information developed and stored in the VRAM 105 is displayed on the display 106.

The memory bus 102 is connected to a keyboard (input means) 108, a mouse (input means) 109, and an external storage 110 through an IO (Input/Output) bus 107. The IO bus 107 is used to exchange data between I/O devices such as the keyboard 108, the mouse 109, and the external storage 110. The keyboard 108 has a large number of keys (not shown) for inputting various kinds of information. The external storage 110 comprises a hard disk or the like and is used as a device for storing the execution program and the execution data or a swap device.

Figure 2:
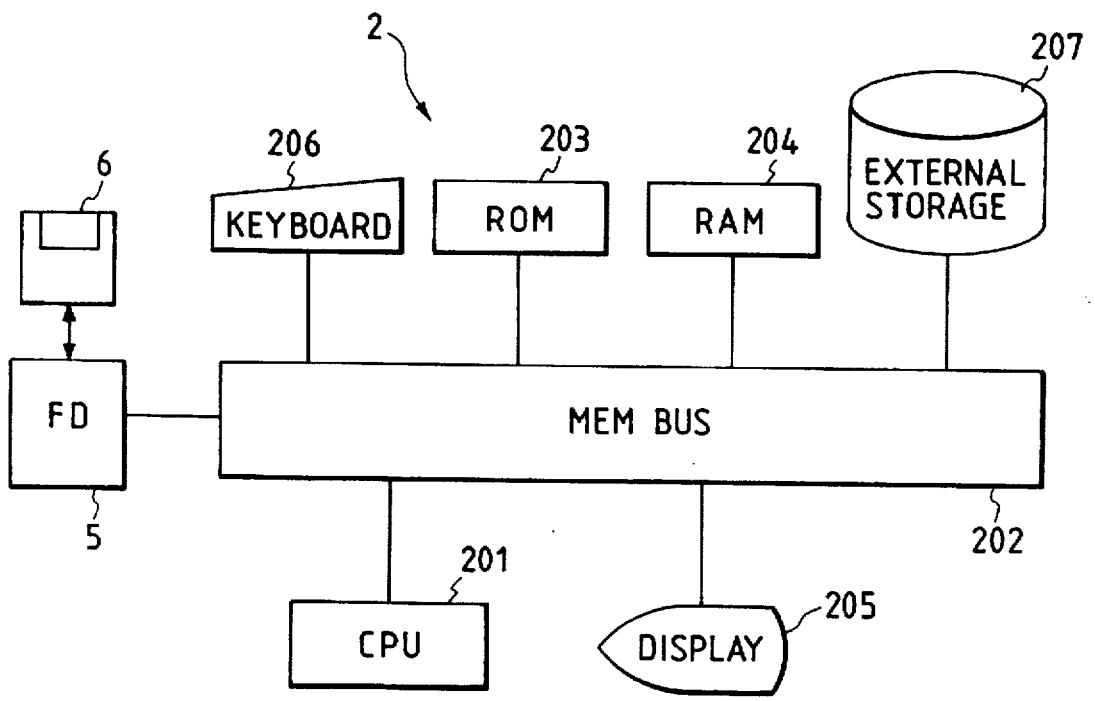
FIG. 2 is a block diagram showing the arrangement of a second information processing apparatus to which the first embodiment of the present invention can be applied.

FIG. 2 is a block diagram showing the arrangement of the second information processing apparatus to which the first embodiment of the present invention can be applied. A second information processing apparatus 2 comprises a CPU 201 for controlling the overall operation of the apparatus 2. The CPU 201 is connected, through a memory bus 202, a ROM 203, a RAM 204, a display 205, a keyboard 206, an external storage 207, and a floppy disk drive 5 for accessing a floppy disk 6.

The memory bus 202 serves to exchange data between the CPU 201 and the ROM 203 and between the CPU 201 and the RAM 204. The ROM 203 serves to store a program for loading an OS (Operating System). The RAM 204 serves to store the OS, an execution program, execution data, and the like of the apparatus 2. The display 205 comprises a CRT, an LCD, or the like, and information is displayed on the display 205. The keyboard 206 comprises a large number of keys (not shown) for inputting various kinds of information. The external storage 207 comprises a hard disk or the like and is used as a device for storing the execution program and the execution data or a swap device.

Figure 3:
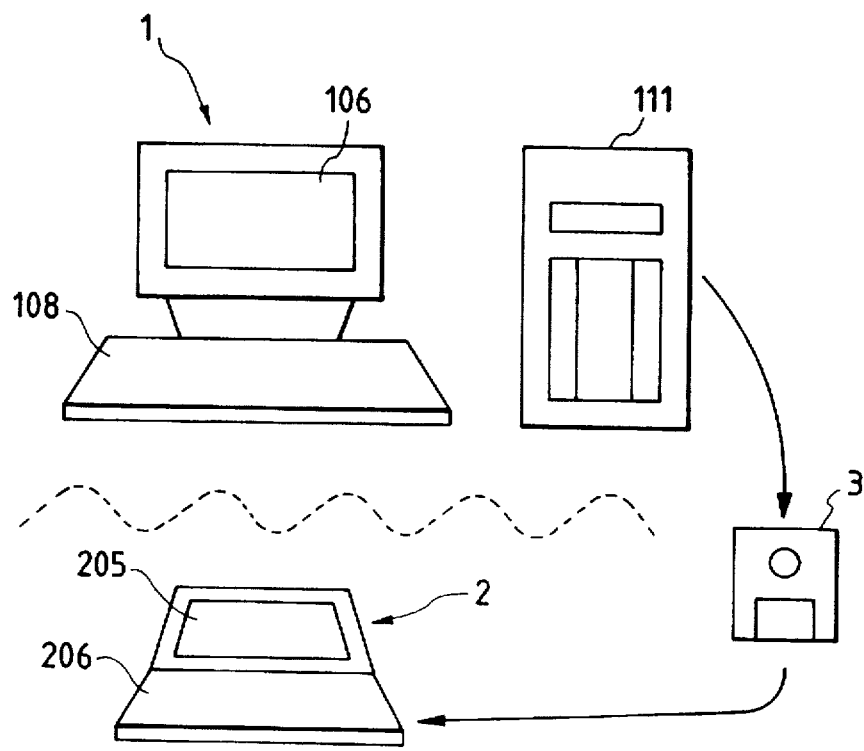
FIG. 3 is a view showing the outer appearance of a processing sequence for files which must be identical in the first and second information processing apparatuses to which the first embodiment of the present invention can be applied.

FIG. 3 is a view showing the outer appearance of a processing sequence for files which must be identical in the first and second information processing apparatuses 1 and 2. The same reference numerals as in FIGS. 1 and 2 denote the same parts in FIG. 3. The first information processing apparatus 1 has an information processing apparatus main body 111, and the information processing apparatus main body 111 incorporates the CPU 101, the ROM 103, the RAM 104, the external storage 110, and the like. Referring to FIG. 3, in the second information processing apparatus 2, the display 205, the keyboard 206, and the like are integrally formed with an information processing apparatus main body which incorporates the CPU 201, the ROM 203, the RAM 204, the external storage 207, and the like. In addition, a portable recording medium 3 is a floppy disk or the like.

Referring to FIG. 3, assume that a processing sequence for a given file is performed in the first and second information processing apparatuses 1 and 2. At this time, a plurality of files may be processed. The first and second information processing apparatuses 1 and 2 are not connected through a network, a serial line, or the like. Data such as file data is exchanged through the portable recording medium 3 such as a floppy disk.

Figure 4:
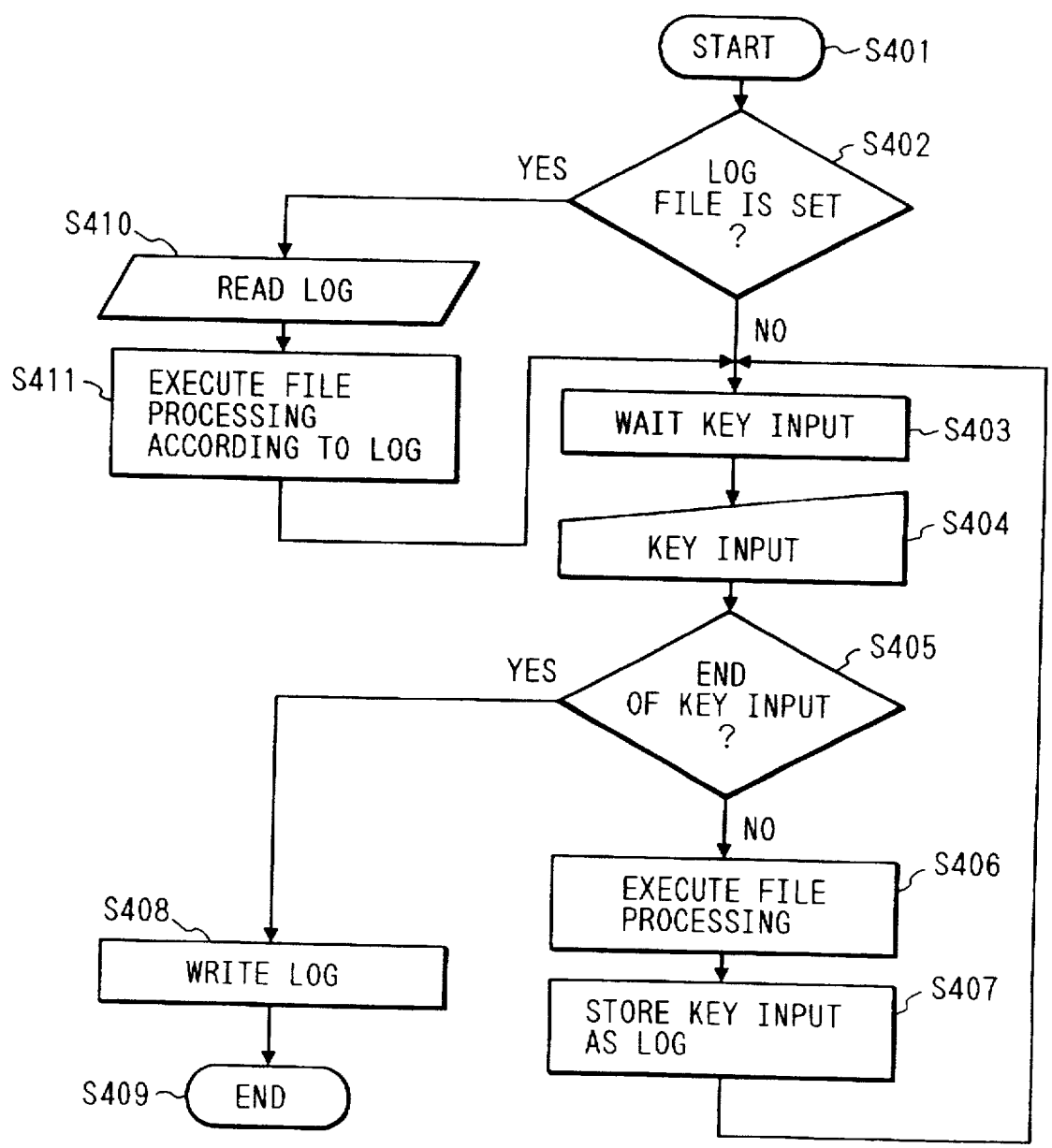
FIG. 4 is a flow chart showing an operation of the first and second information processing apparatuses to which the first embodiment of the present invention can be applied.

An operation for executing a processing sequence for the given file in the first information processing apparatus 1 and the subsequent processing for this file in the second information processing apparatus 2 will be described with reference to FIG. 4. FIG. 4 is a flow chart showing an operation of the first and second information processing apparatuses to which the first embodiment of the present invention can be applied.

Assume that the contents of files (work files) present in the first and second information processing apparatuses 1 and 2 are identical to each other. When the first information processing apparatus 1 is started in step S401, the CPU 101 determines in step S402 whether a log file is set. As file modification processing has not been performed before, any log file is not set. A determination result is negative (NO) in step S402, and the flow advances to step S403 to wait a key input from the keyboard 108. When a key input is made in step S404, the CPU 101 determines in step S405 whether the key input is ended. If the key input is not ended, the flow advances to step S406. The CPU 101 executes file processing in accordance with the input key instruction. In step S407, the key input is stored as a log. The flow returns to step S403 to wait another key input.

The above processing is repeated to execute a predetermined processing sequence. When an end command is then input, the determination result in step S405 becomes affirmative (YES). The flow advances to step S408. The CPU 101 writes the log, stored in step S407, in the portable recording medium 3 such as a floppy disk. This processing sequence is ended in step S409.

When the continuation of the processing sequence for the file in the first information processing apparatus 1 is to be executed in the second information processing apparatus 2, the user carries the recording medium 3 on which the log is recorded in the first information processing apparatus 1 and connects this recording medium 3 to the second information processing apparatus 2. When the second information processing apparatus 2 is started in step S401, the determination result in step S402 becomes affirmative (YES) because the log file is already set. The flow advances to step S410. The CPU 201 reads the log from the recording medium 3. The log describes a key operation. For this reason, in step S411, the CPU 201 executes file processing on the basis of this log. The flow returns to step S403 to wait another key input.

When a key input is made in step S404, the CPU 201 determines in step S405 whether the key input is ended. If the key input is not ended, the flow advances to step S406. The CPU 201 executes file processing in accordance with the input key instruction. The key input is stored as a log in step S407. The flow then returns to step S403 to wait another key input.

The above processing is repeated to execute a predetermined processing sequence. When an end command is then input, the determination result in step S405 becomes affirmative (YES). The flow advances to step S408. The CPU 201 writes the log, stored in step S407, in the portable recording medium 3 such as a floppy disk. This processing sequence is ended in step S409.

If the end command is input without any revision, the CPU 201 writes, in step S408, a log representing that no operation is performed. This processing sequence is ended in step S409. If the recording medium 3 recorded with the log representing that no operation is performed is connected to the information processing apparatus to execute file processing, no file processing associated with the log is executed because the log file is not set in step S402.

In this embodiment, since the key input itself is used as a log, identity of a plurality of files can be easily maintained without recognizing files which should be identical to each other.

Note that file processing has been exemplified in this embodiment, but the present invention is not limited to file processing. The present invention is also applicable to a processing sequence for other entities except for files. The floppy disk has been exemplified as the portable recording medium. However, the portable recording medium is not limited to this. A detachable hard disk, a streamer, or other various recording media may be used in place of the floppy disk.

(Second Embodiment)

Figure 5:
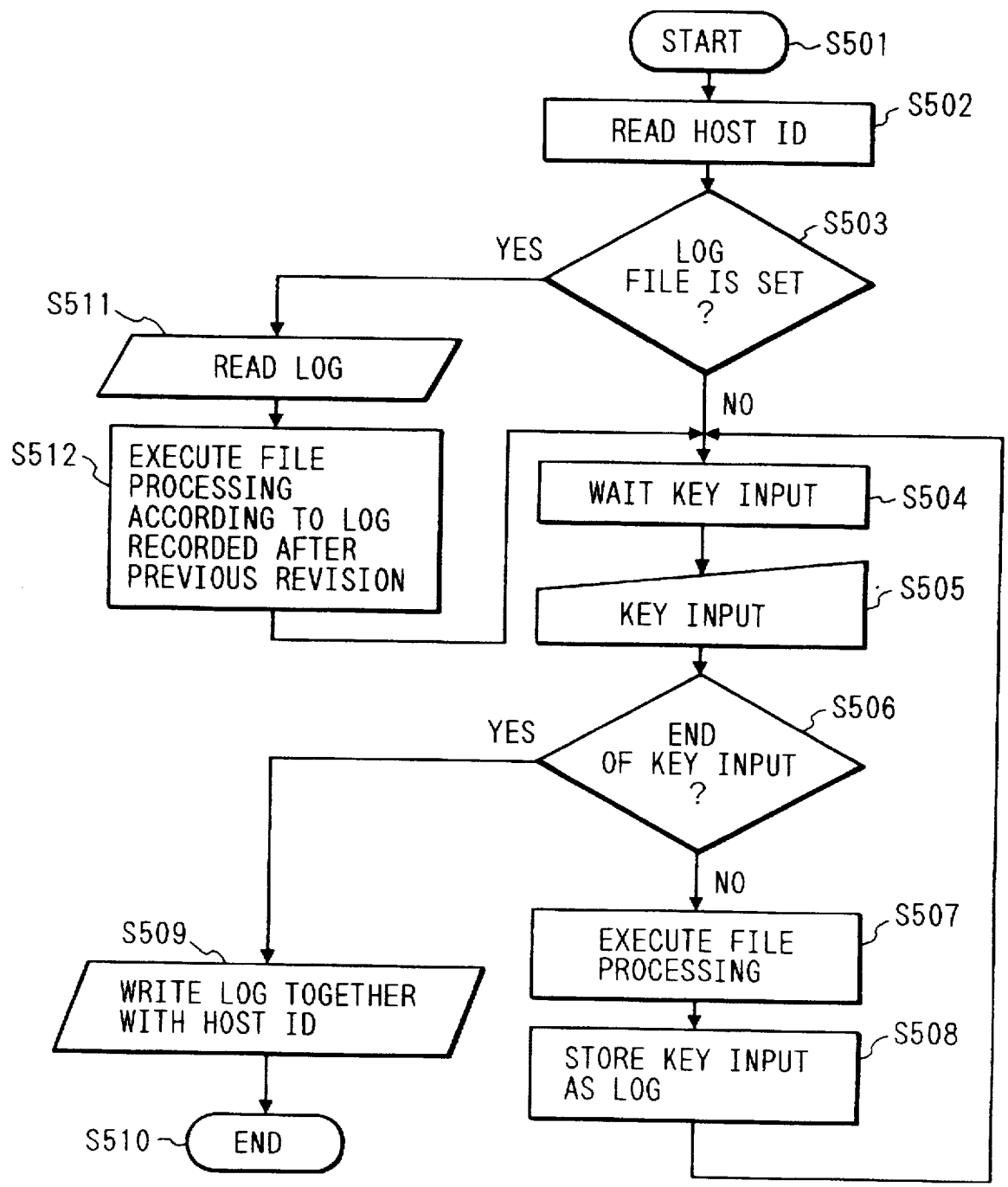
FIG. 5 is a flow chart showing an operation of the first and second information processing apparatuses to which the second embodiment of the present invention can be applied.

The second embodiment of the present invention will be described with reference to FIG. 5. The basic arrangements of the first and second information processing apparatuses of this embodiment are the same as those of the first embodiment in FIGS. 1 to 3, and a description will be made with reference to FIGS. 1 to 3. FIG. 5 is a flow chart showing an operation of the first and second information processing apparatuses to which the second embodiment of the present invention can be applied.

An operation for executing a processing sequence for the given file in a first information processing apparatus 1 and the subsequent processing for this file in a second information processing apparatus 2 will be described below.

Assume that the contents of files present in the first and second information processing apparatuses 1 and 2 are identical to each other. When the first information processing apparatus 1 is started in step S501, a CPU 101 reads a host ID (Identification) for identifying a host (information processing apparatus) for performing this processing sequence. The CPU 101 determines in step S503 whether a log file is set. As file modification processing has not been performed before, any log file is not set. A determination result is negative (NO) in step S503, and the flow advances to step S504 to wait a key input from a keyboard 108. When a key input is made in step S505, the CPU 101 determines in step S506 whether the key input is ended. If the key input is not ended, the flow advances to step S508. The CPU 101 executes file processing in accordance with the input key instruction. In step S508, the key input is stored as a log. The flow returns to step S504 to wait another key input.

The above processing is repeated to execute a predetermined processing sequence. When an end command is then input, the determination result in step S506 becomes affirmative (YES). The flow advances to step S509. The CPU 101 writes the log stored in step S508 together with the ID code read in step S502, in the portable recording medium 3 such as a floppy disk. This processing sequence is ended in step S510.

When the continuation of the processing sequence for the file in the first information processing apparatus 1 is to be executed in the second information processing apparatus 2, the user carries a recording medium 3 on which the log is recorded together with the ID code in the first information processing apparatus 1 and connects this recording medium 3 to the second information processing apparatus 2. When the second information processing apparatus 2 is started in step S501, a CPU 201 reads the host ID code in step S502. The determination result in step S503 becomes affirmative (YES) because the log file is already set. The flow advances to step S511. The CPU 201 reads the log from the recording medium 3. In step S512, the CPU 201 searches the previously set host ID code from the log and executes file processing on the basis of a subsequent log. The flow returns to step S504 to wait another key input.

If the host ID code is not present in step S512, the host ID code has not been set. File processing is performed on the basis of all the recorded logs. The flow then returns to step S504 to wait another key input.

When a key input is made in step S505, the CPU 201 determines in step S506 whether the key input is ended. If the key input is not ended, the flow advances to step S507. The CPU 201 executes file processing in accordance with the input key instruction. The key input is stored as a log in step S508. The flow then returns to step S504 to wait another key input.

The above processing is repeated to execute a predetermined processing sequence. When an end command is then input, the determination result in step S506 becomes affirmative (YES). The flow advances to step S509. In the portable recording medium 3 such as a floppy disk, the CPU 201 writes the log stored in step S508 together with the host ID code read in step S502. This processing sequence is ended in step S510.

If the end command is input without any revision, the CPU 201 writes, in step S509, a log representing that no operation is performed. This processing sequence is ended in step S510.

Assume that file processing is to be performed in three or more information processing apparatuses in the first embodiment described above. In this case, since a log is recorded once every time a file is modified, modification processing must be performed in all the information processing apparatuses every time a file is modified in one information processing apparatus. Even if a file modification history is continuously recorded, the file modification cannot be reflected on all the information processing apparatuses because there is no means for determining the specific time at which the previous modifications have been reflected.

To the contrary, according to the second embodiment, a host ID code is recorded together with a corresponding log to reflect the log on a corresponding modified file. The logs of previous modifications are reflected, so that processing of identical files can be performed in three or more information processing apparatuses which are not connected through a network or the like.

(Third Embodiment)

Figure 6:
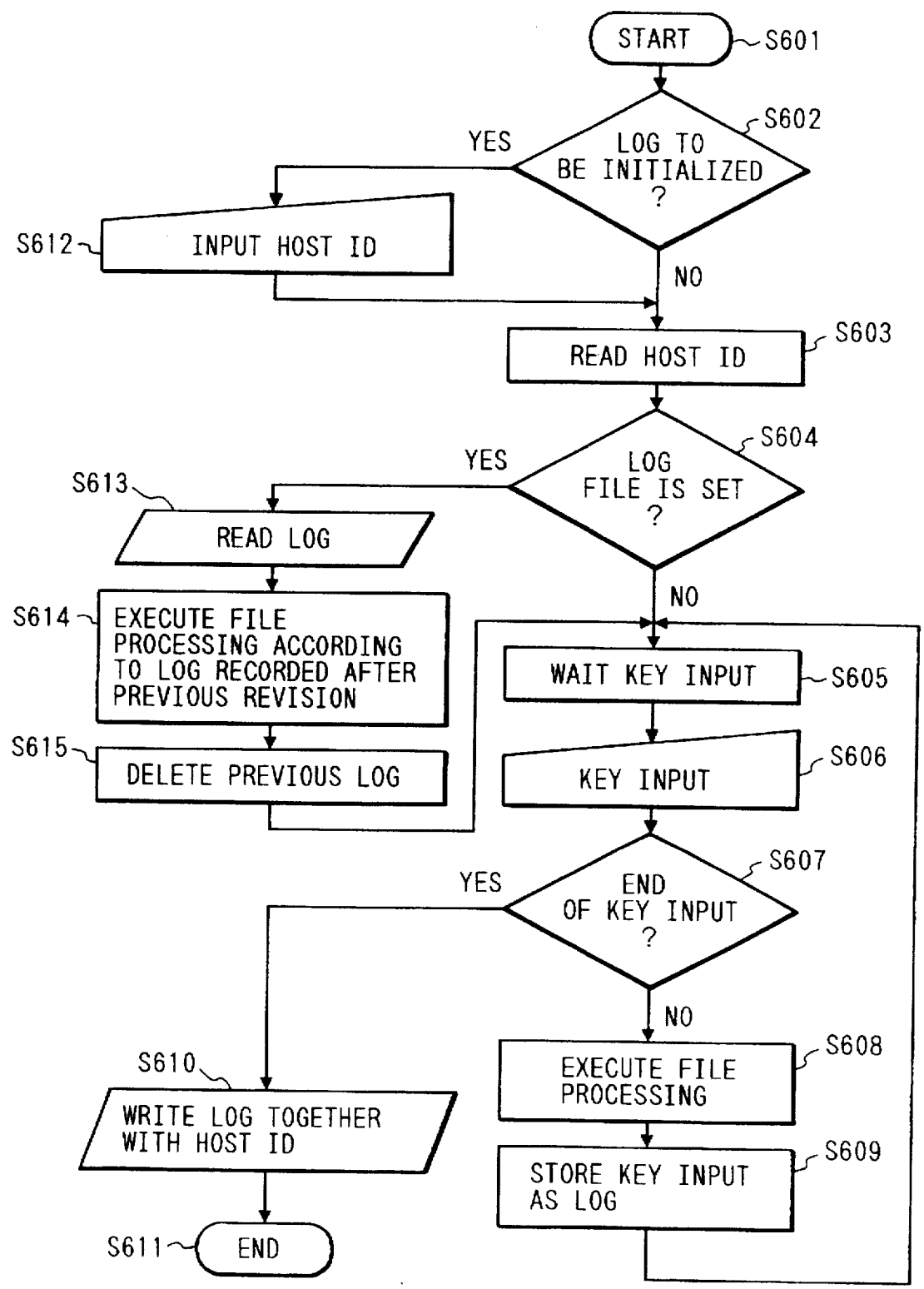
FIG. 6 is a flow chart showing an operation of the first and second information processing apparatuses to which the third embodiment of the present invention can be applied.

The third embodiment of the present invention will be described with reference to FIGS. 6 and 7. The basic arrangements of the first and second information processing apparatuses of this embodiment are the same as those of the first embodiment in FIGS. 1 to 3, and a description will be made with reference to FIGS. 1 to 3. FIG. 6 is a flow chart showing an operation of the first and second information processing apparatuses to which the third embodiment of the present invention can be applied.

An operation for executing a processing sequence for the given file in a first information processing apparatus 1 and the subsequent processing for this file in a second information processing apparatus 2 will be described below.

Assume that the contents of files present in the first and second information processing apparatuses 1 and 2 are identical to each other. When the first information processing apparatus 1 is started in step S601, a CPU 101 determines in step S602 whether a log is to be initialized. If YES in step S602, the flow advances to step S612 to input all host ID codes for identifying all hosts (information processing apparatuses) subjected to initialization of logs, and the flow advances to step S603. The CPU 101 reads the host ID codes in step S603. The flow then advances to step S604 to determine whether a log file is set.

As file modification processing has not been performed before, any log file is not set. A determination result is negative (NO) in step S604, and the flow advances to step S605 to wait a key input from a keyboard 108. When a key input is made in step S606, the CPU 101 determines in step S607 whether the key input is ended. If the key input is not ended, the flow advances to step S608. The CPU 101 executes file processing in accordance with the input key instruction. In step S609, the key input is stored as a log. The flow returns to step S605 to wait another key input.

The above processing is repeated to execute a predetermined processing sequence. When an end command is then input, the determination result in step S607 becomes affirmative (YES). The flow advances to step S610. The CPU 101 writes the log stored in step S609 together with the ID code read in step S603, in the portable recording medium 3 such as a floppy disk. This processing sequence is ended in step S611.

When the continuation of the processing sequence for the file in the first information processing apparatus 1 is to be executed in the second information processing apparatus 2, the user carries a recording medium 3 on which the log is recorded together with the ID code in the first information processing apparatus 1 and connects this recording medium 3 to the second information processing apparatus 2. When the second information processing apparatus 2 is started in step S601, a CPU 201 determines in step S602 whether logs are to be initialized. If initialization of logs is performed, the previous revision is deleted. For this reason, the logs are not initialized. The determination result in step S602 is negative (NO). The flow advances to step S603, and the CPU 201 reads the host ID code. The determination result in step S604 becomes affirmative (YES) because the log file is already set. The flow advances to step S613. The CPU 201 reads the log from the recording medium 3. In step S614, the CPU 201 searches the previously set host ID code from the log and executes file processing on the basis of a subsequent log. If the host ID code is not present in step S614, the host ID code has not been set. File processing is performed on the basis of all the recorded logs. In step S615, the CPU 201 checks all the host ID codes in the logs and deletes all the logs which have been reflected on all the registered hosts. The flow then returns to step S605 to wait another key input.

The above processing is repeated to execute a predetermined processing sequence. When an end command is then input, the determination result in step S607 becomes affirmative (YES). The flow advances to step S610. In the portable recording medium 3 such as a floppy disk, the CPU 201 writes the log stored in step S609 together with the host ID code read in step S603. This processing sequence is ended in step S611.

If the end command is input without any revision, the CPU 201 writes, in step S610, a log representing that no operation is performed. This processing sequence is ended in step S611.

A method of checking whether each log is reflected on all the registered hosts will be described with reference to FIG. 7. Numbers 1 to 7 in FIG. 7 are log recording numbers, and the logs are ordered from the oldest log. Letters (A) to (C) represent all the registered hosts. Seven processing operations are performed for the three information processing apparatuses. Each mark * represents that a processing operation is performed.

Figures 7, 8:
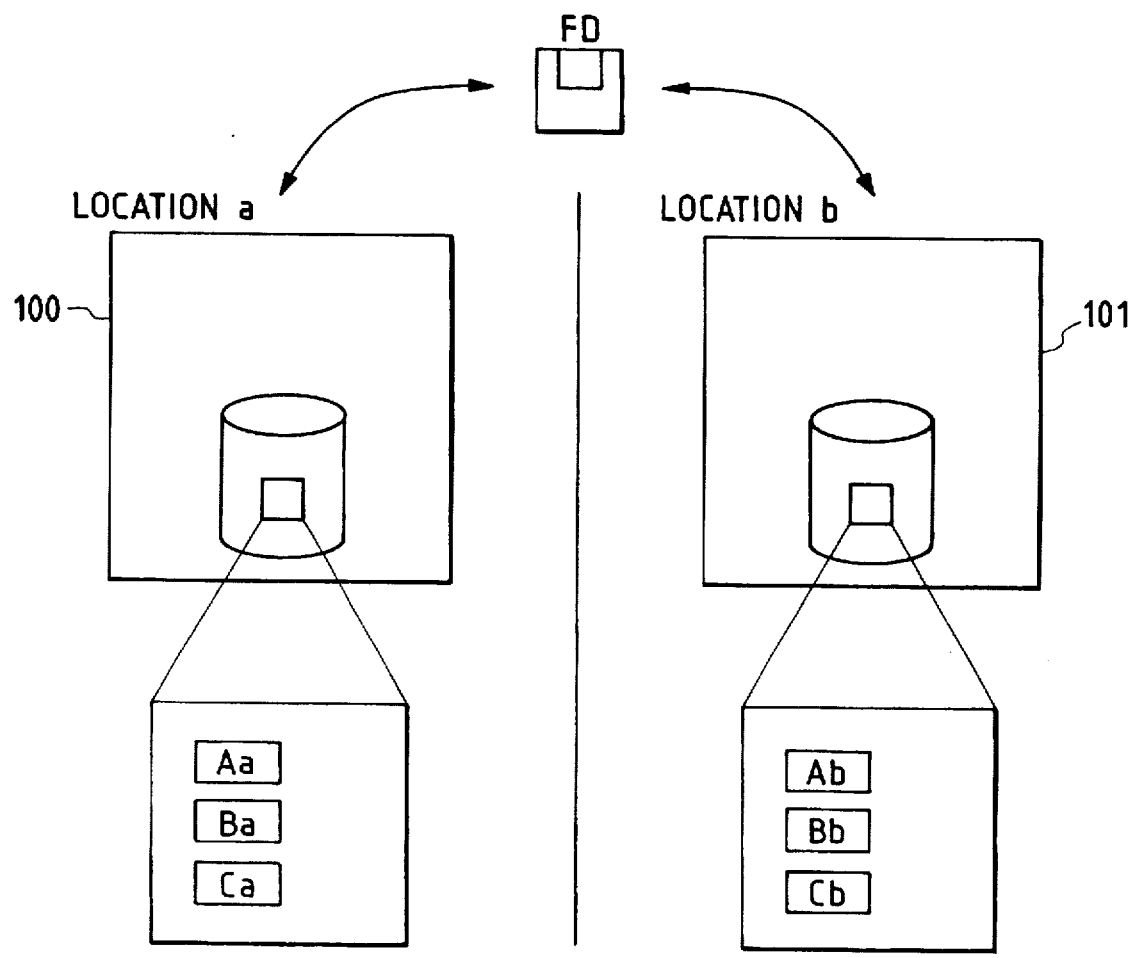
FIG. 7 is a view for explaining a method of checking whether a log is reflected on all the registered hosts in the first and second information processing apparatuses to which the third embodiment of the present invention can be applied.
FIG. 8 is a view showing the concept of the present invention.

Referring to FIG. 7, up to the fourth processing operation, the previous logs cannot be deleted because the logs are not reflected on the host (C). When the log is reflected on the host (C) in the fifth processing operation, the first and second logs can be deleted because the fourth and third processing operations are performed for the hosts (B) and (A), respectively. At the end of the sixth processing operation, the logs are reflected on the host (B) in the sixth processing operation, the host (C) in the fifth processing operation, and the host (A) in the third processing operation. For this reason, the logs in the first and second processing operations can be apparently deleted. The logs in the first and second processing operations have already been deleted in the fifth write or processing operation. No log is deleted in the sixth processing operation. At the end of seventh processing operation, the logs are reflected on the host (A) in the seventh processing operation, the host (B) in the sixth processing operation, and the host (C) in the fifth processing operation. Therefore, the previous logs before the fourth processing operation can be apparently deleted.

In the second embodiment, all the logs must be kept stored to undesirably result in a large log file. However, according to the third embodiment, the hosts are limited for identical files, and each log reflected on all the registered hosts can be deleted.

As has been described above, in an information processing method and an apparatus therefor, when files and the like which must be identical to each other in a plurality of information processing apparatuses which are not connected through a network or the like are to be made, the contents of processing operations for the files and the like are recorded by a recording means of the information processing apparatus main body. The recorded contents of the processing operations are recorded on a portable recording medium, and this recording medium is carried and connected to a given information processing apparatus. This given information processing apparatus performs processing operations of identical files and the like stored therein. Therefore, identity of the files present in the plurality of information processing apparatuses which are not connected through a network or the like can be maintained.

The contents of the log file will be described in detail for each of (1) a modification, (2) an addition, and (3) a deletion of a file at one location. A file modification (addition or deletion) and an operation of this embodiment upon updating the file will be described below. Assume that a file is modified, added, or deleted at a location a, and that maintenance for consistency of the file is to be performed at a location b in FIG. 8.

Prior to all the processing operations, information processing apparatuses are bootstrapped at both the locations a and b, and a predetermined procedure for modifying the contents of a file is performed in the information processing apparatus at the location a before or after a floppy disk (FD) 5 is loaded. If a user only refers to the contents of a file and no consistency is required, i.e., if the user need not always refer to the latest contents, the procedure for allowing to modify the contents can be omitted.

Figure 9:
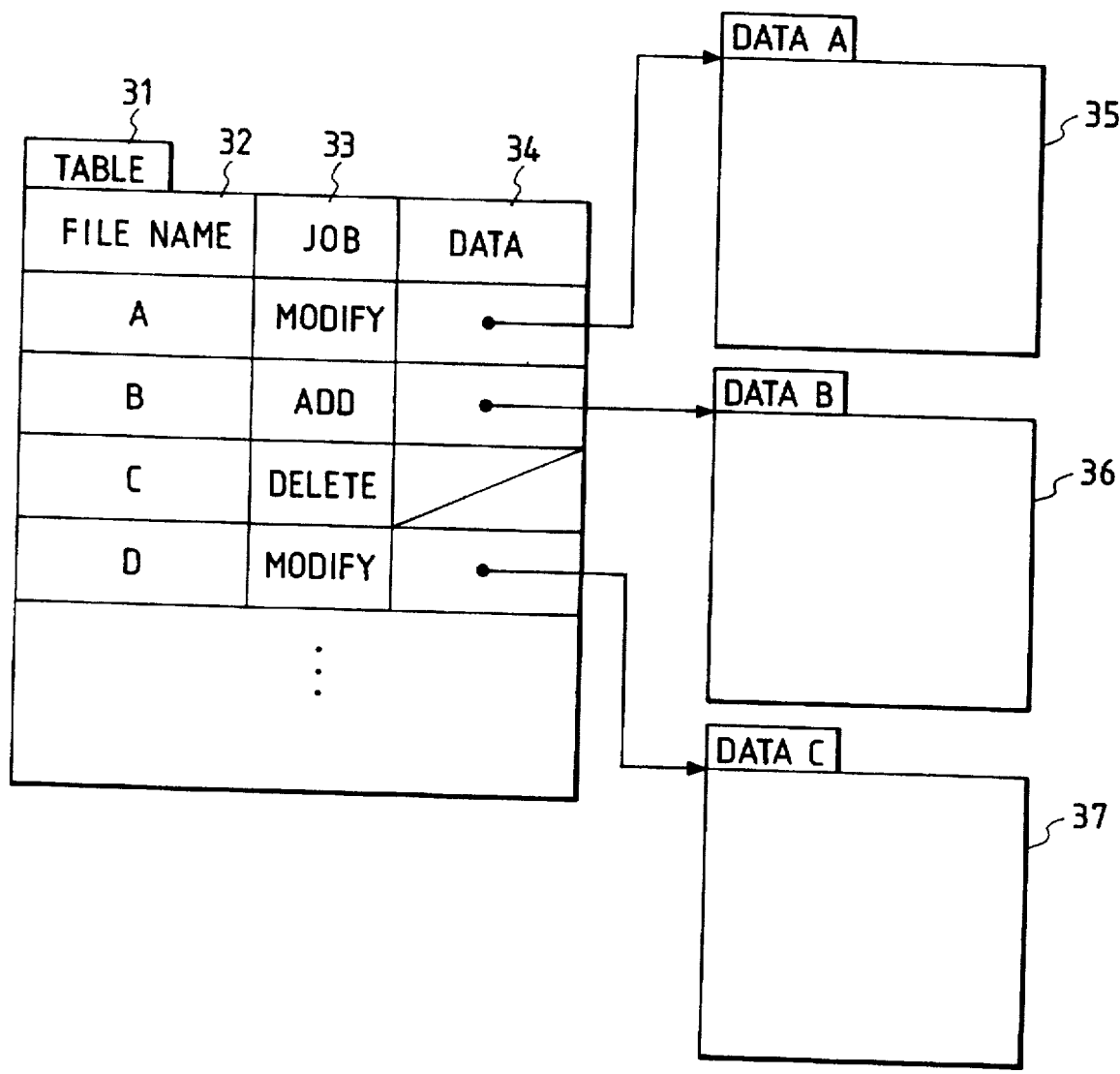
FIG. 9 is a view showing a file structure according to the embodiments of the present invention.

Job information and its management can be realized using an information processing apparatus, and its example is shown in FIG. 9. FIG. 9 shows a table 31 for managing file names of modified, added, and deleted files, and their contents. In this embodiment, this table is realized as a general file and stored in a portable medium (floppy disk). A file name field 32 represents a job such as a modification, addition, or deletion. A data field 34 represents differences 35 and 37 between old and new files in a "modify" job or data 36 including a new file itself in an "add" job (no data is present in a "delete" job). The data 35, 36, and 37 are also general files realized on the portable medium.

Figure 10:
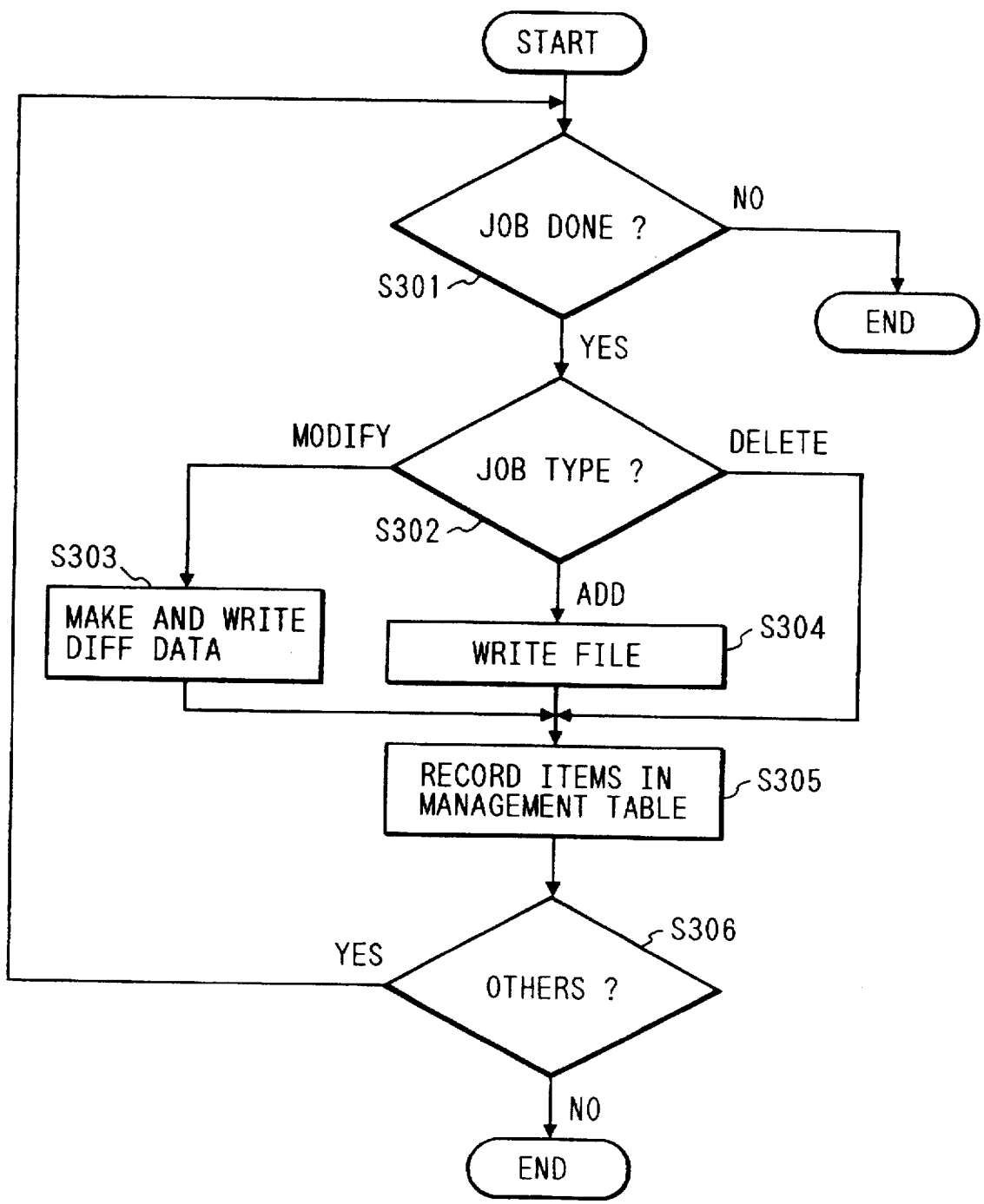
FIG. 10 is a view showing a modification (at the end of session) processing sequence in the embodiments of the present invention.

When a file is modified, added, or deleted at the location a (modification side), the following processing (FIG. 10) is performed at the end of session.

When it is confirmed in step S301 that a job is done, the flow advances to step S302. When the contents of a given file A are modified in step S302, the contents are recorded as a difference between the old file before the modification and the new file after the modification in the form of a file in a portable medium in step S303 (the difference can be made using a diff command on, e.g., the UNIX operating system). In the management table realized in the portable medium, a "modify" job is performed for the file "A", and an item representing that the difference is stored in a file dataA is recorded (S305).

When a file B which has not been present is made in step S302, the contents of the file B itself are recorded as a new data file in the portable medium (S304). The file "B" is "added" to the management table, and an item representing that the contents are stored in a file dataB is recorded (S305).

When a file C is deleted in step S302, an item representing that the file "C" is "deleted" is recorded (S305); no data is present.

The above operations are performed for all the jobs (S306).

Figure 11:
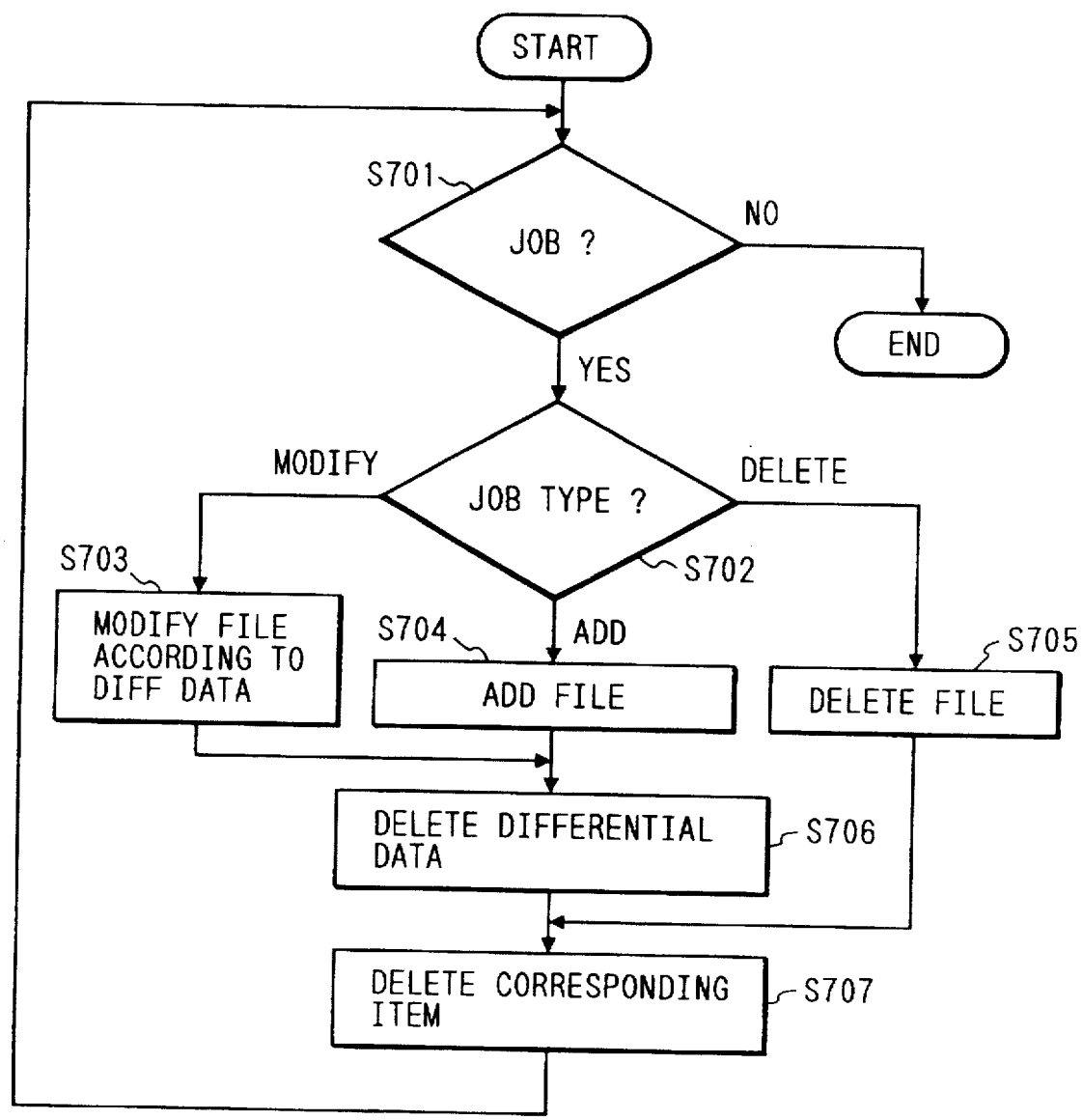
FIG. 11 is a view showing a modification (at the start of session) processing sequence in the embodiments of the present invention.

The processing flow at the updating side (processing at the location b) using the above portable medium is shown in FIG. 11. The user loads the portable medium or FD 5 before he starts a job. The management table in the portable medium is read to check "modify", "add", and "delete" jobs (S701). If no job is present, processing is ended.

If it is determined in step S702 that a job type is a "modify" job, a file having a name (A in FIG. 9) in the file name field is searched in the storage (RAM 3 or HD 4) of the information processing apparatus. The difference between the old file and the modified new file, which is stored in a file in the portable medium and represented by the data field of the management table, is used and applied to the old file in the storage to reproduce the contents of the new file in the storage (S703). This can be realized using a patch command on, e.g., the UNIX operating system. The difference data is deleted from the portable medium (S706), and the item in the management table is deleted (S707).

If it is determined in step S702 that the job type is an "add" job, a file having a name (B in FIG. 9) in the file name field of the management table is made, and the contents of a file represented in the data field of the management table are copied (S704). The added data is deleted from the portable medium (S706), and the item is deleted from the management table (S707).

If it is determined in step S702 that the job type is a "delete" job, a file having the name D is searched in the storage and is deleted (S705), and the item is deleted from the management table (S707).

The above processing is repeated until no jobs are present (S701).

Although not described above, a file "delete" job may be combined with a file "add" job to modify a file name. Alternatively, a job for modifying a file name may be additionally provided.

In this embodiment, a floppy disk is exemplified as a portable medium. However, the portable medium is not limited to this. The portable storage medium may be a magnetooptical disk (MO), a magnetic tape, a streamer, a removable hard disk, a RAM disk MIC card, or the like.

Figure 12:
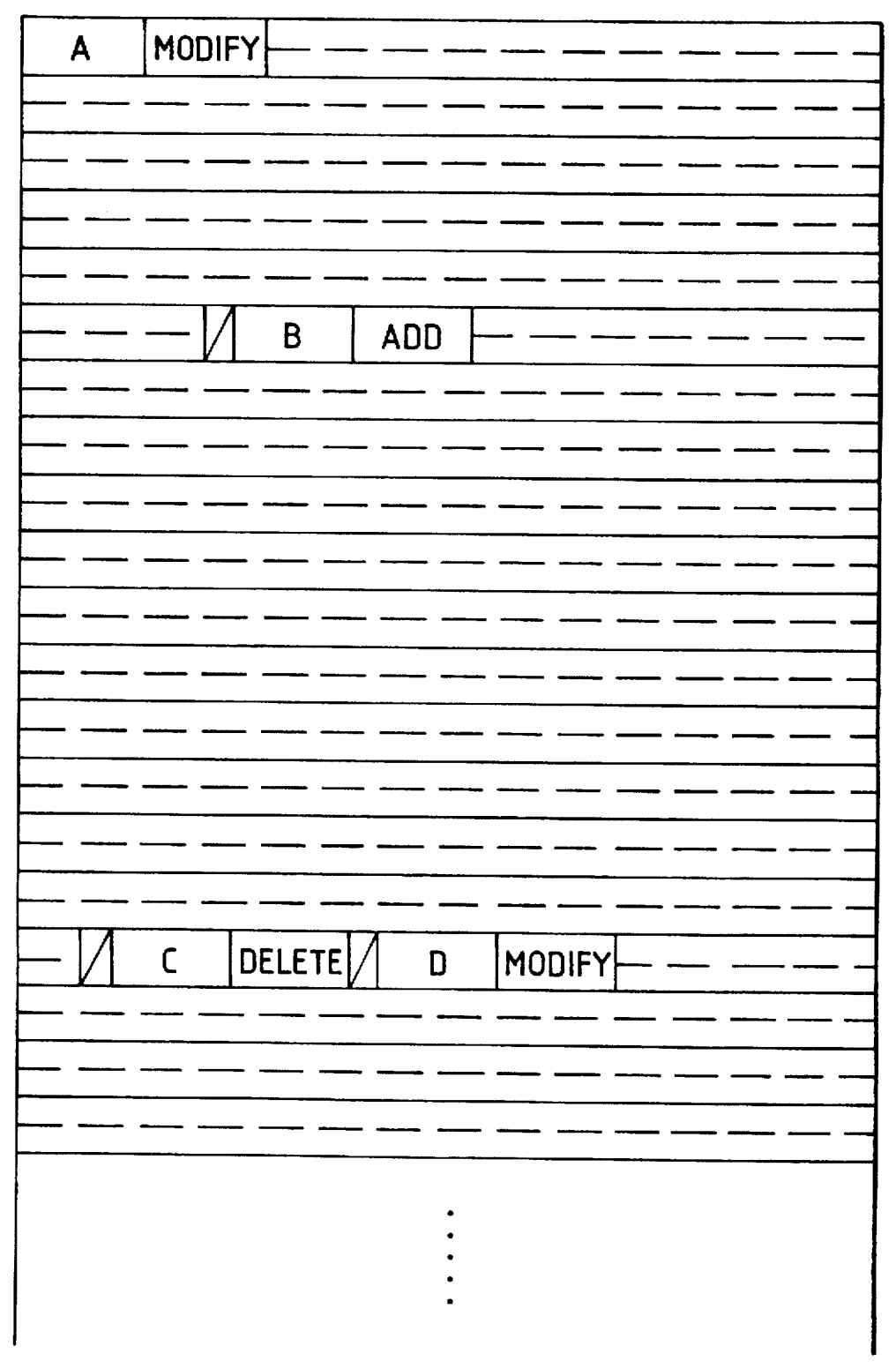

In the management table and recording of content data, instead of using a general file (system), data may be written in a medium (e.g., a floppy disk) in a form having no structure as a file. This example is shown in FIG. 12. In this embodiment, since metadata required for file management need not be used in this embodiment, the utilization efficiency of the medium can be improved. This is suitable for processing with a medium (e.g., a tape or streamer) which is not suitable for random access in principle. This method can be realized using a simple sequential read/write operation even if a general file system cannot be utilized on a portable medium.

All jobs (e.g., the respective key strokes) are recorded as a log. In this case, an operation for making a difference and storage of an old file need not be performed. However, a data volume in a portable medium increases.

As described above, when the user has the contents of identical files at a plurality of locations and uses these contents to maintain consistency of the files between the plurality of locations, the following effects can be obtained:

A job to be done by the user can be reduced.

A mismatching caused by a manual operation error can be eliminated.

A difference is used to reduce data in a portable medium to be carried.

A small-capacity medium can cope with a large-capacity storage accordingly.

(Fourth Embodiment)

Figure 13:
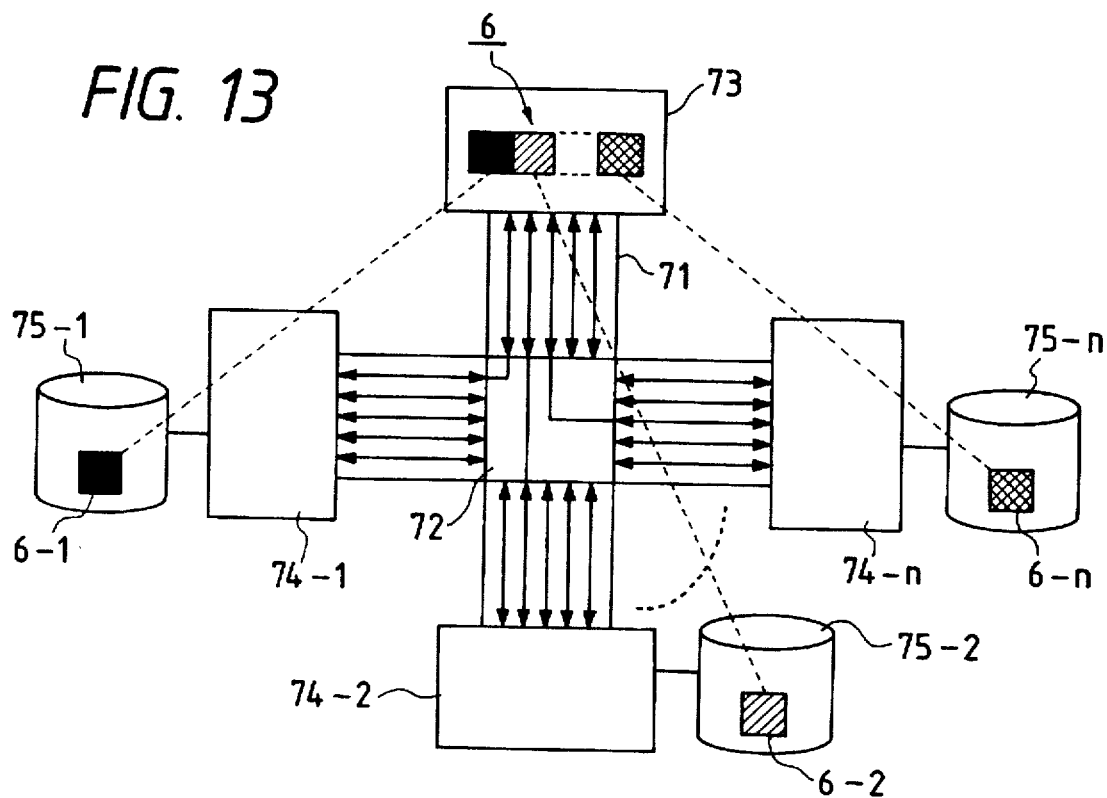
FIG. 13 is a block diagram showing the fourth embodiment of the present invention.

FIG. 13 is a view showing a system according to this embodiment. Referring to FIG. 13, the system comprises a network (optical wavelength division multiplexing network) serving as a communication line, a concentrator 72, a client 73, servers 74-1 to 74-n, and secondary storages 75-1 to 75-n, a file 76, and segments 76-1 to 76-n constituting the file 76 (the concentrator is not an essential component).

Figure 14:
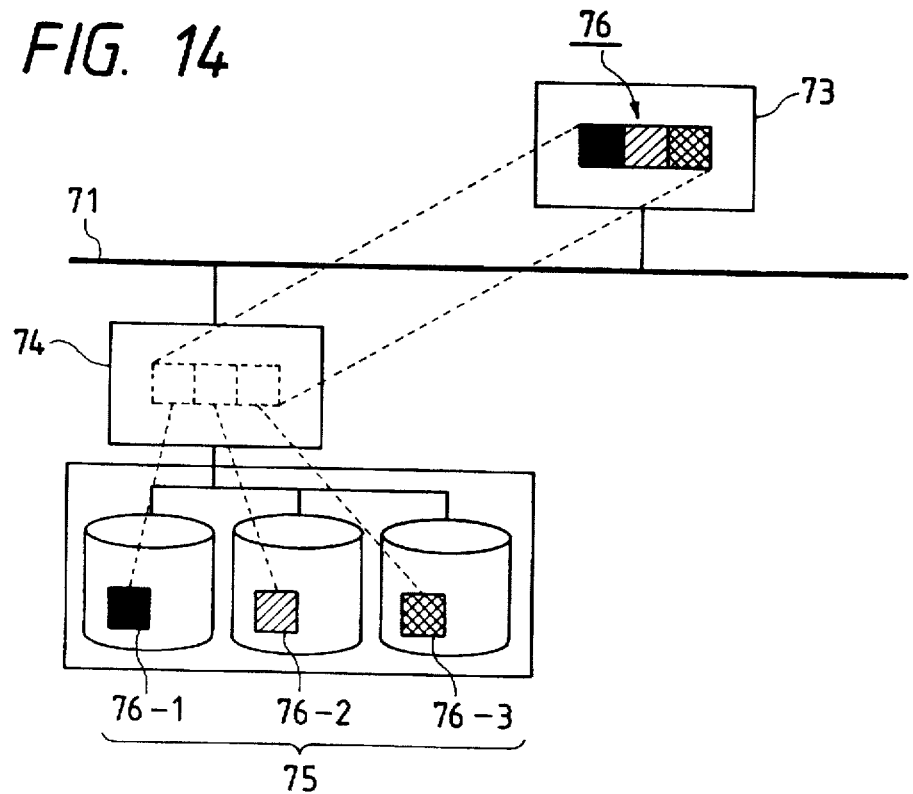
FIG. 14 is a block diagram showing a disk array device.

In this embodiment, a disk array unit such as a RAID (Redundant Arrays of Inexpensive Disks) to compensate for the low access speed of the secondary storages is used (FIG. 14). The same reference numerals as in FIG. 13 denote the same parts in FIG. 14. The RAIDs are classified into five levels as RAID1 to RAID5 in accordance with their storage schemes. The present invention is applicable to all these levels.

This embodiment is realized such that disks physically integrated as an array, i.e., one device at one location are distributed in a plurality of servers using the optical wavelength division multiplexing network, thereby virtually integrating the distributed secondary storages.

Each of the wavelengths in the optical wavelength division multiplexing network is assigned to data transfer between the client and each server having a secondary storage, thereby performing high-speed data transfer.

Referring to FIG. 13, the client 73 divides file data into appropriate blocks in read/write access to the file 76. An algorithm for this division can be the same dividing method as in a general disk array such as a RAID. Redundancy information such as a parity can be added.

The client adds a host ID (server ID), an ID (client ID) of a file ID itself, and a serial number of each divided segment in the original file to each divided data and requests write access to the secondary storages of the plurality of servers through the network 71. A format of data transmitted from the client to each server is shown in FIG. 15. Upon reception of data, the servers manage each specific server to which an arbitrary segment in the file is stored. This management is performed using a table (FIG. 16) made in each server on the basis of the data transmitted from the client. This table indicates the secondary storage of each specific host (server) to which one segment indicated by the serial number in the file is stored. An example of management using this table is shown in FIG. 17. More specifically, upon reception of data transmitted from the client, the table in FIG. 16 is referred to using the file ID and the serial number in the data in step S111. It is determined in step S112 whether the received serial number is of its own node (i.e., the client ID of its own). If YES in step S112, the secondary storage (disk) of its own node is referred to (S113). However, if NO in step S112, the secondary storage (disk) of other node is referred to.

Uniqueness of IDs between machines (hosts) constructing a system can be maintained using the host ID of the client and the file ID unique to each client. In data transmission, one independent wavelength of a plurality of wavelengths in the optical wavelength division multiplexing network is used in communication between the client and each server. In this case, an appropriate wavelength is selected between the hosts in accordance with arbitration.

Upon reception of a request from the client, each server inputs or outputs data in accordance with this request as in a conventional distributed file system. In this case, the storage area of the secondary storage is managed using the received file ID and the received serial number.

In read access, specific data in a file designated by a pair of host and file IDs is transferred by each server through an independent wavelength in the optical wavelength division multiplexing network in accordance with a request from the client.

The client rearranges data sent from each server and perfectly restores a file. If a parity is also received, the client performs a parity check.

(Fifth Embodiment)

In the fourth embodiment, in data transfer between the client and each server, an appropriate wavelength of the plurality of wavelengths in the optical wavelength division multiplexing network is selected in accordance with arbitration every time communication is required. However, in the fifth embodiment, a wavelength to be used is reserved in advance.

In this case, wavelength arbitration time prior to a file input/output operation can be omitted, so that access time can be expected to be shortened. Since each wavelength is permanently assigned to each pair of client and each server, the network can be free from influences of communication for various services except for the distributed file system, thereby performing a higher-speed operation.

The fourth and fifth embodiments have exemplified the optical wavelength division multiplexing networks. The present invention is not limited to this, but can be applied to any network whose communication capacity can be divided, such as a time division network. Realization of a network whose communication capacity can be divided has been described. The present invention is not limited to this, but can also be realized on a general network whose speed is sufficiently higher than that of a secondary storage. The present invention is also applicable to various topological forms including bus, star, and ring networks.

As described above, according to the fourth and fifth embodiments, the secondary storages distributed in a high-speed network are processed like a disk array. A high access speed can be realized using low-speed secondary storages without introducing expensive devices. In addition, the upper limit of the transfer speed in a network, which occurs in access to a conventional disk array device through a network, and a reduction in file access speed, which occurs in network congestion, can be eliminated.

As has been described above, according to the present invention, identity for identical files can be easily maintained between a plurality of independent information storages, and high-speed access to the secondary storages distributed in a network can be realized.

What is claimed is:

1. An information processing method of causing a plurality of information processing apparatuses to process information, comprising the steps of:

recording contents of a processing operation for data in recording means in one of the plurality of information processing apparatuses;

recording the recorded contents of the processing operation together with identification information identifying the one information processing apparatus in a portable recording medium; and reflecting the recorded contents of the processing operation in each of the rest of the plurality of information processing apparatuses in accordance with the contents of the processing operation and the identification information recorded in the portable recording medium, wherein said reflecting step includes reflecting the recorded contents of the processing operation which have not been reflected since the previous reflecting operation in each of the rest of the plurality of information processing apparatuses.

2. A method according to claim 1, further comprising the step of reading an identification code of each of the plurality of information processing apparatuses.

3. A method according to claim 2, further comprising the step of recording the identification code of each information processing apparatus together with the contents of the processing operation for the data.

4. A method according to claim 3, further comprising the step of registering an identification code of an information processing apparatus to be used.

5. A method according to claim 4, further comprising the step of deleting the recorded contents of the processing operation on the basis of an identification code of a registered information processing apparatus, and the identification code of each information processing apparatus which is recorded together with the contents of the processing operation for the data.

6. An information processing method in processing information by using a plurality of independent information processing apparatuses having respective information storages, comprising the steps:

recording, in recording means, editing information representing results of an editing operation including one of a modification, an addition, and a deletion of the information stored in any one of the plurality of information storages together with identification information identifying one of the plurality of the information processing apparatuses having the one information storage; and reflecting the results of the editing operation of the information in the information storage of each of the rest of the plurality of information processing apparatuses in accordance with the editing information and the identification information stored in the recording means, wherein said reflecting step reflects the results of the editing operation which have not been reflected since the previous reflecting operation in each of the rest of the plurality of information processing apparatuses.

7. A method according to claim 6, wherein the recording means is a portable recording medium.

8. An information processing apparatus of a plurality of information processing apparatuses, comprising:

first recording means, arranged in a main body of one of the information processing apparatuses, for recording contents of a processing operation performed on data;

a portable recording medium for recording the contents of the processing operation recorded in said first recording means together with identification information identifying the one information processing apparatus; and operating means for reflecting the recorded contents of the processing operation in each of the rest of the plurality of information processing apparatuses in accordance with the contents of the processing operation recorded in said portable recording medium, wherein the reflecting includes reflecting the recorded contents of the processing operation which have not been reflected since the previous reflecting operation in each of the rest of the plurality of information processing apparatuses.

9. An apparatus according to claim 8, further comprising means for reading an identification code of each of the plurality of information processing apparatuses.

10. An apparatus according to claim 9, further comprising second recording means for recording the identification code of each information processing apparatus together with the contents of the processing operation for the data.

11. An apparatus according to claim 10, further comprising means for registering an identification code of an information processing apparatus to be used.

12. An apparatus according to claim 11, further comprising means for deleting the recorded contents of the processing operation on the basis of an identification code of the information processing apparatus which is registered in said registering means, and the identification code of each information processing apparatus which is recorded in said second recording means.

13. An information processing apparatus for use as part of a plurality of such information processing apparatuses, comprising:

a plurality of independent information storages capable of storing identical information;

means for recording editing information representing results of an editing operation including one of a modification, an addition, and a deletion of information stored in any of said plurality of information storages together with identification information identifying one of the plurality of the information processing apparatuses having the one information storage; and means for reflecting the results of the editing operation of the information in the information storage of each of the rest of the plurality of information processing apparatuses in accordance with the editing information and the identification information stored in the recording means, wherein the reflecting includes reflecting the results of the editing operation which have not been reflected since the previous reflecting operation in each of the rest of the plurality of information processing apparatuses.

14. An apparatus according to claim 13, wherein said recording means is a portable recording medium.

* * * * *